(12) United States Patent
Rand (10) Patent No.: US 10,508,419 B1
(45) Date of Patent: Dec. 17, 2019

(54) RAINWATER COLLECTION DEVICE (71) Applicant: Thomas Rand, Rochester, MA (US)

(72) Inventor: Thomas Rand, Rochester, MA (US)

(*) Notice: Subject to any disclaimer, the term of this patent is extended or adjusted under 35 U.S.C. 154(b) by 219 days.

(21) Appl. No.: 15/723,480

(22) Filed: Oct. 3, 2017

(51) Int. Cl.
*E03B 1/04* (2006.01)
*E03B 3/03* (2006.01)
*B62K 5/00* (2013.01)
*E04D 13/04* (2006.01)

(52) U.S. Cl.
CPC ............. *E03B 1/042* (2013.01); *E03B 3/03* (2013.01); *B62K 5/00* (2013.01); *C02F 2303/24* (2013.01); *E03B 2001/047* (2013.01); *E04D 2013/0495* (2013.01)

(58) Field of Classification Search
CPC ...... E03B 1/042; E03B 3/03; E03B 2001/047; B62K 5/00; C02F 2303/24; E04D 2013/0495; Y10T 137/6969
See application file for complete search history.

(56) References Cited

U.S. PATENT DOCUMENTS

| | | | |
|---|---|---|---|
| 6,182,683 B1* | 2/2001 | Sisk | F24D 17/0078 137/337 |
| 7,025,879 B1 | 4/2006 | Ticknor | |
| D542,885 S | 5/2007 | Knackstedt | |
| 8,561,633 B2 | 10/2013 | Early | |
| 8,808,537 B1* | 8/2014 | Livingston | C02F 9/005 210/196 |
| 2004/0040598 A1* | 3/2004 | Zimmerman, Jr. | E03B 1/04 137/357 |
| 2004/0168992 A1* | 9/2004 | Ben-Amotz | E03B 1/04 210/805 |
| 2005/0139531 A1* | 6/2005 | Gordon | B01D 29/15 210/108 |
| 2009/0212051 A1 | 8/2009 | Liu | |
| 2011/0005602 A1 | 1/2011 | Harrington | |
| 2014/0231328 A1 | 8/2014 | Sheehy | |
| 2014/0262998 A1* | 9/2014 | Wagner | E03B 3/03 210/143 |
| 2014/0346099 A1 | 11/2014 | Brantley | |
| 2015/0077040 A1* | 3/2015 | Longdon | H02J 7/0052 320/107 |
| 2015/0107683 A1* | 4/2015 | Dass | F04B 23/02 137/15.11 |
| 2015/0204055 A1* | 7/2015 | Khalifeh | B01D 29/92 210/137 |
| 2016/0177545 A1* | 6/2016 | Robb | E03B 1/042 137/2 |

FOREIGN PATENT DOCUMENTS

WO 2013045673 A1 4/2013

* cited by examiner

*Primary Examiner* — Mary E McManmon
*Assistant Examiner* — Patrick C Williams
(74) *Attorney, Agent, or Firm* — Kyle A. Fletcher, Esq.

(57) ABSTRACT

The rainwater collection device: 1) pumps accumulated rainfall from one or more storage containers into a reservoir; and, 2) pumps irrigation water from the reservoir to one or more plants identified by the user. The rainwater collection device mounts on a wheeled cart that readily transports the accumulated rainfall throughout the space of a domestic garden. The rainwater collection device comprises a reservoir, a distribution system, a plurality of hoses, and a cart. The reservoir, the distribution system, and the plurality of hoses mount on the cart.

19 Claims, 8 Drawing Sheets

RAINWATER COLLECTION DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of building including water supply and distribution, more specifically, a domestic rainwater distribution system.

The success of gardening often requires a reliable supply of inexpensive water. One simple way for domestic gardeners to create an inexpensive water supply is to collect rainwater draining from a roof into one or more storage containers such as a barrel. A typical rain barrel is estimated to hold between 50 and sixty gallons of rainwater at a weight of between 400 and 500 pounds. This weight represents a problem for the typical domestic gardener who has neither the strength nor the equipment to move such a mass. Clearly, a convenient method to transport and distribute accumulated rainwater would be of a benefit for domestic gardeners who accumulate rainwater.

SUMMARY OF INVENTION

The rainwater collection device addresses the difficulties in distributing rainwater that accumulates in one or more storage containers.

The rainwater collection device: 1) pumps accumulated rainfall from one or more storage containers into a reservoir; and, 2) pumps irrigation water from the reservoir to one or more plants identified by the user. The rainwater collection device mounts on a wheeled cart that readily transports the accumulated rainfall throughout the space of a domestic garden. The rainwater collection device comprises a reservoir, a distribution system, a plurality of hoses, and a cart. The reservoir, the distribution system, and the plurality of hoses mount on the cart.

These together with additional objects, features and advantages of the rainwater collection device will be readily apparent to those of ordinary skill in the art upon reading the following detailed description of the presently preferred, but nonetheless illustrative, embodiments when taken in conjunction with the accompanying drawings.

In this respect, before explaining the current embodiments of the rainwater collection device in detail, it is to be understood that the rainwater collection device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the rainwater collection device.

It is therefore important that the claims be regarded as including such equivalent construction insofar as they do not depart from the spirit and scope of the rainwater collection device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
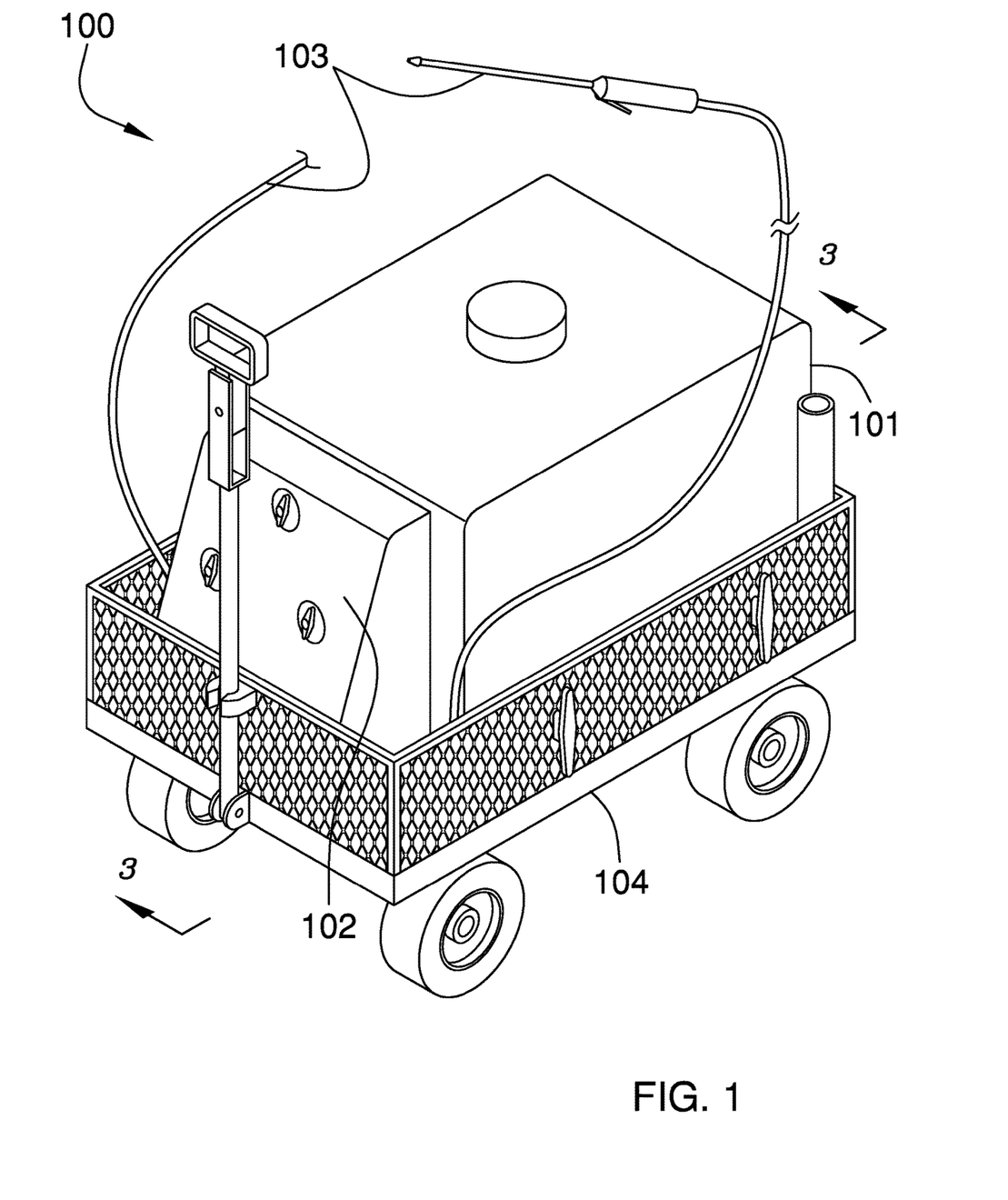
FIG. 1 is a perspective view of an embodiment of the disclosure.
Figure 2:
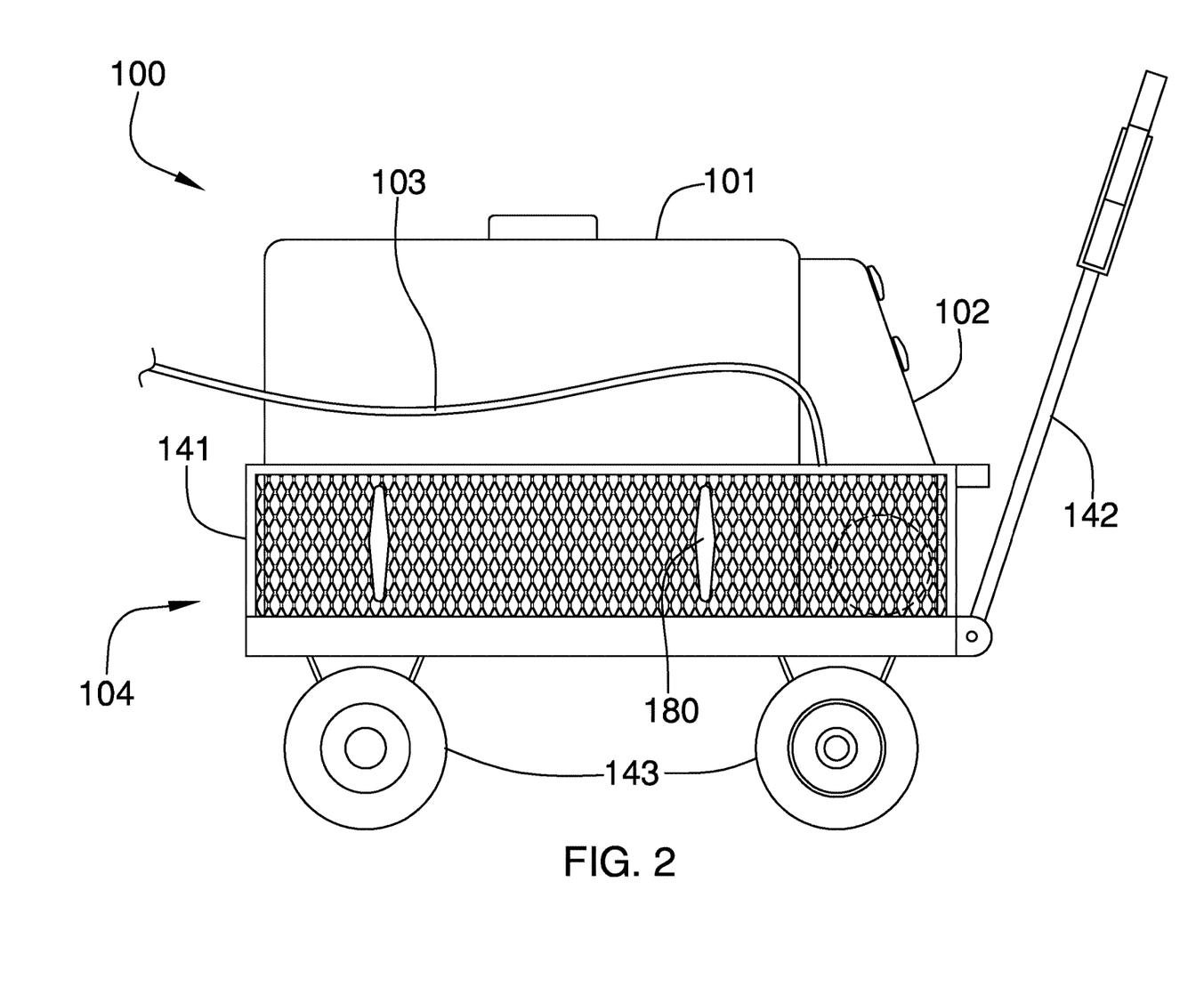
FIG. 2 is a side view of an embodiment of the disclosure.
Figure 3:
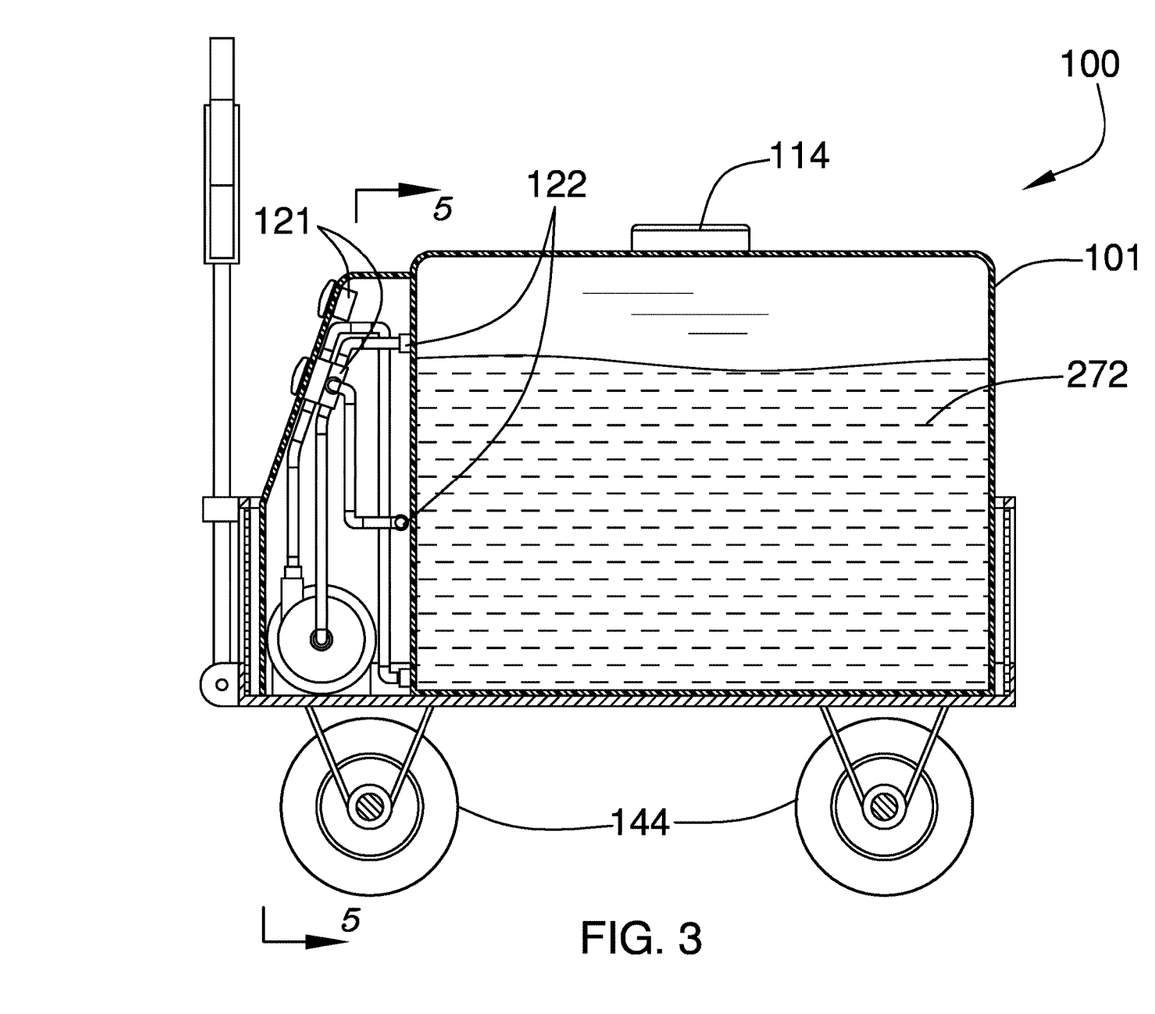
FIG. 3 is a cross-sectional view of an embodiment of the disclosure across 3-3 as shown in FIG. 1.
Figure 4:
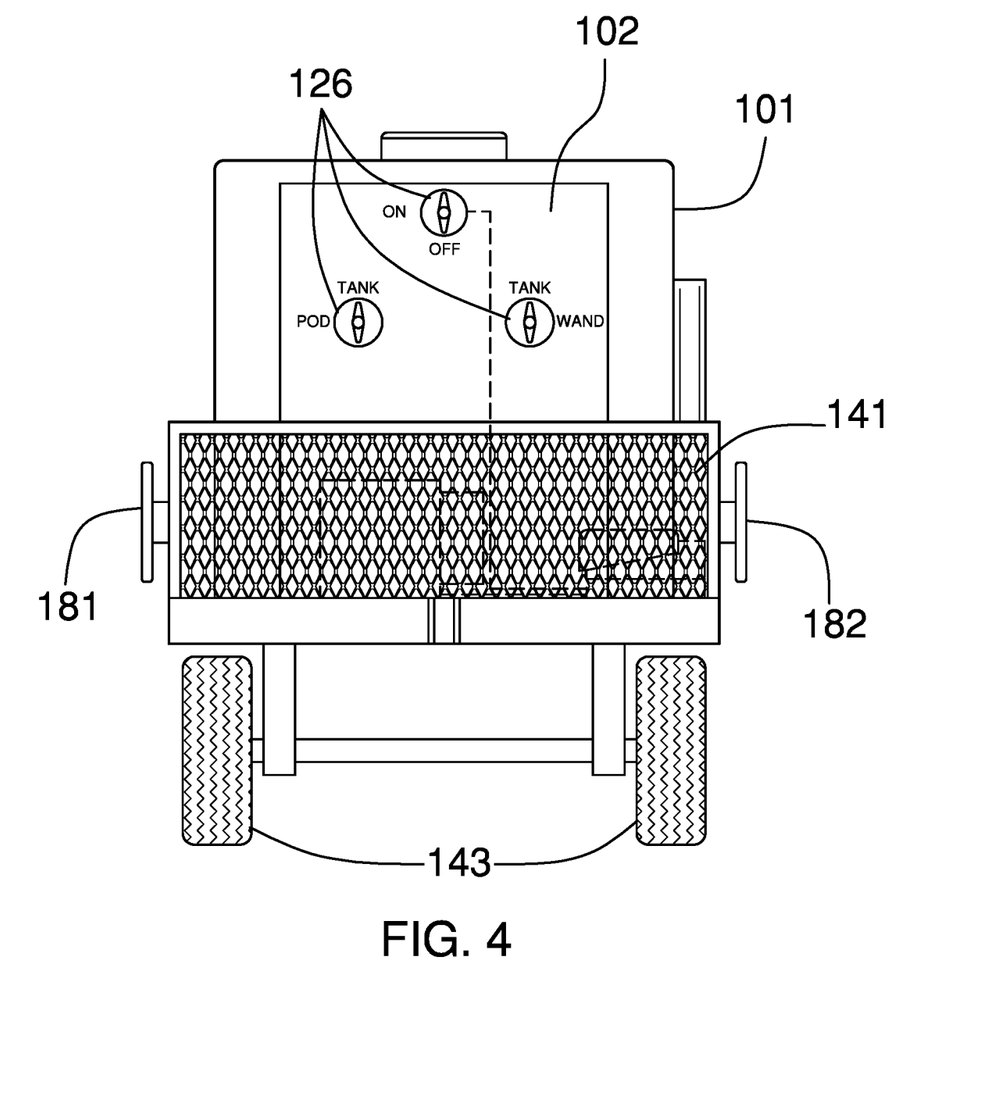
FIG. 4 is a front view of an embodiment of the disclosure.
Figure 5:
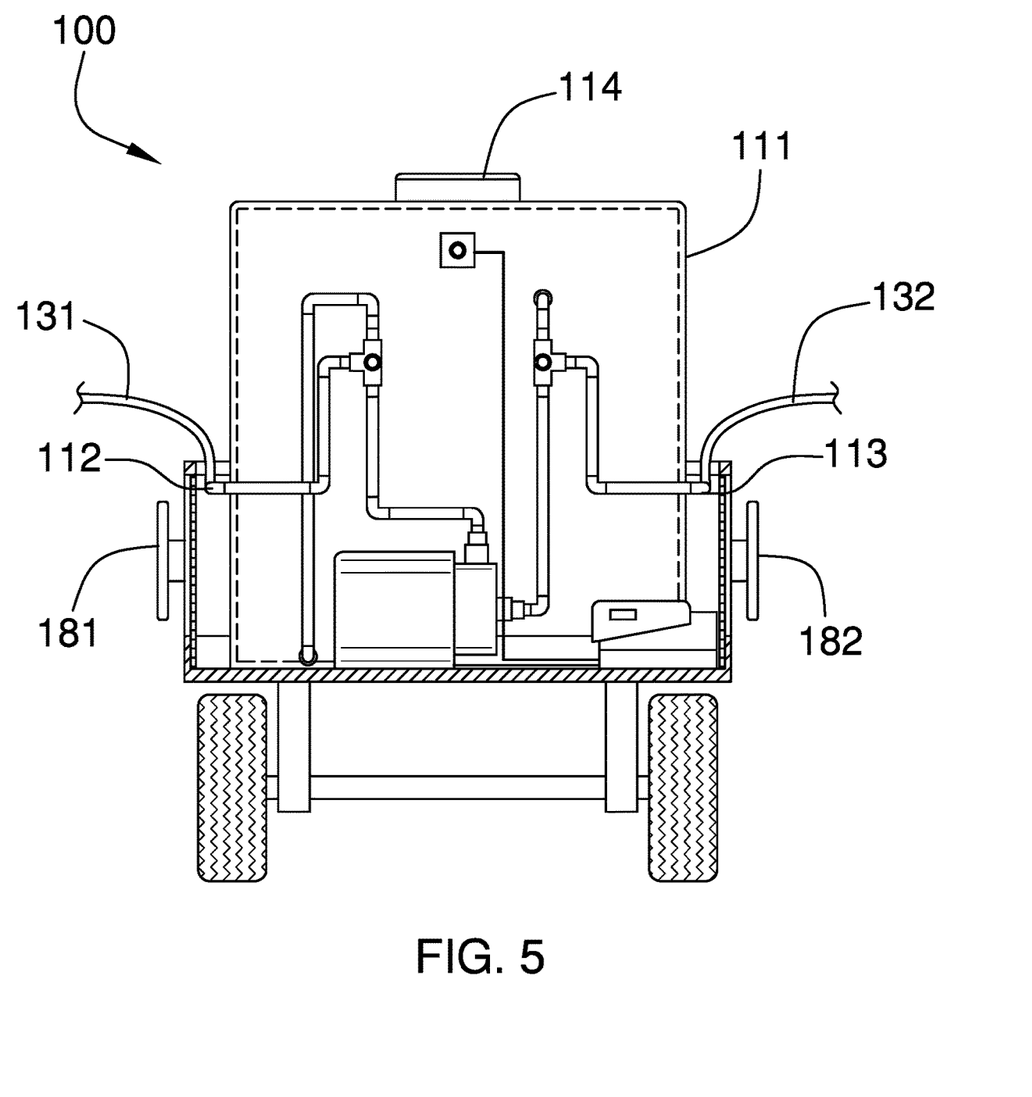
FIG. 5 is a cross-sectional view of an embodiment of the disclosure across 5-5 as shown in FIG. 3.
Figure 6:
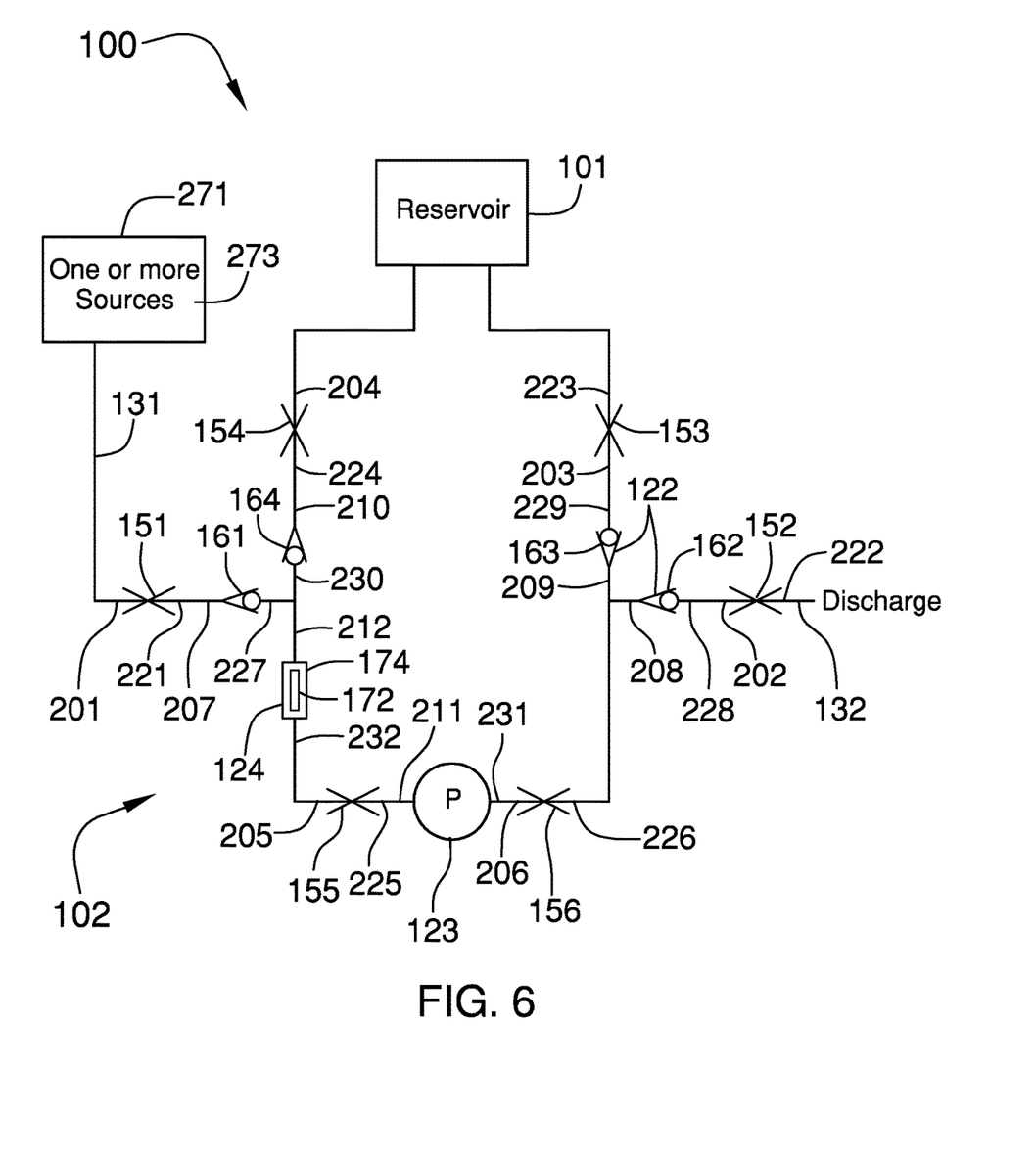
FIG. 6 is a block diagram of an embodiment of the disclosure.
Figure 7:
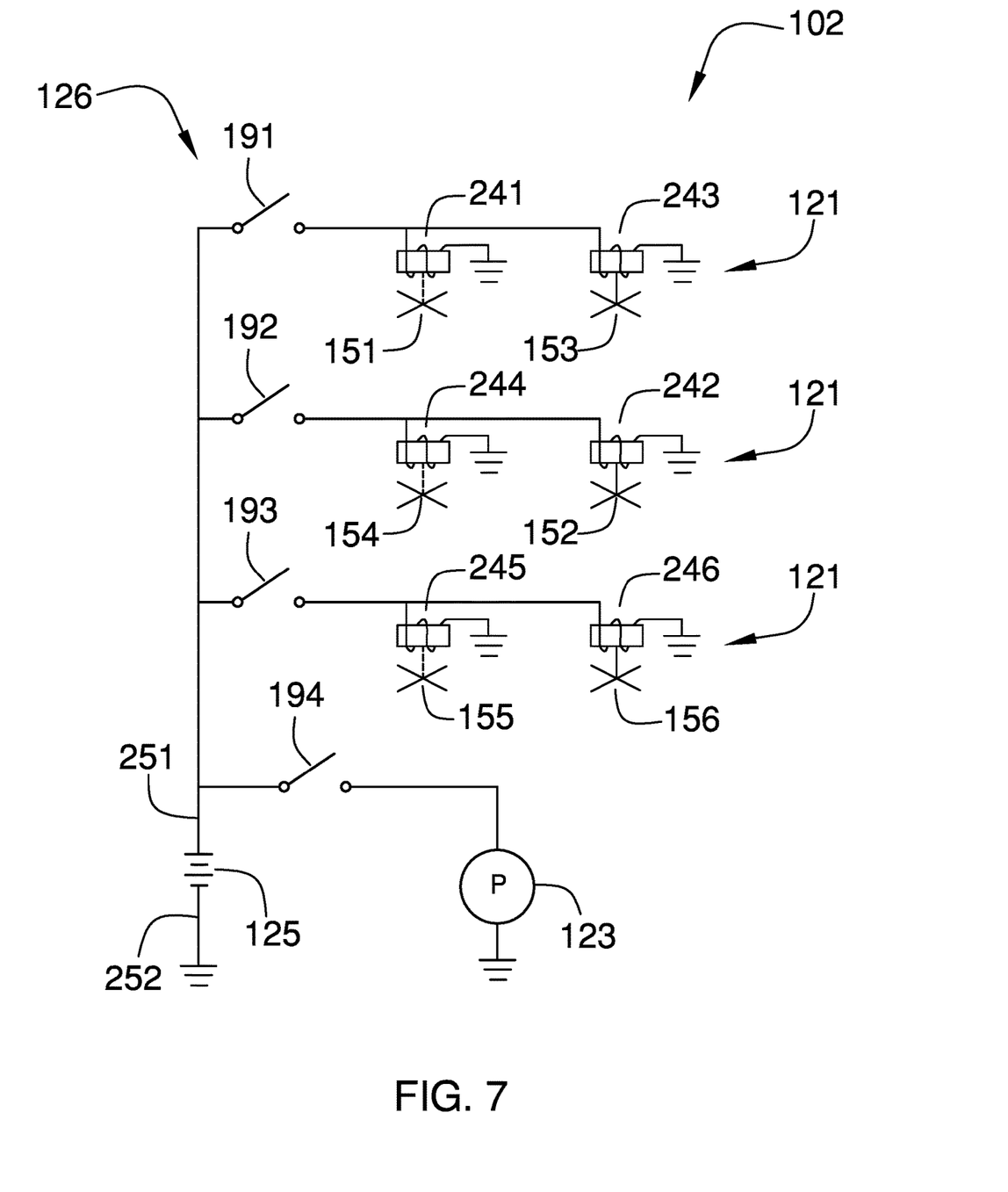
FIG. 7 is a schematic view of an embodiment of the disclosure.
Figure 8:
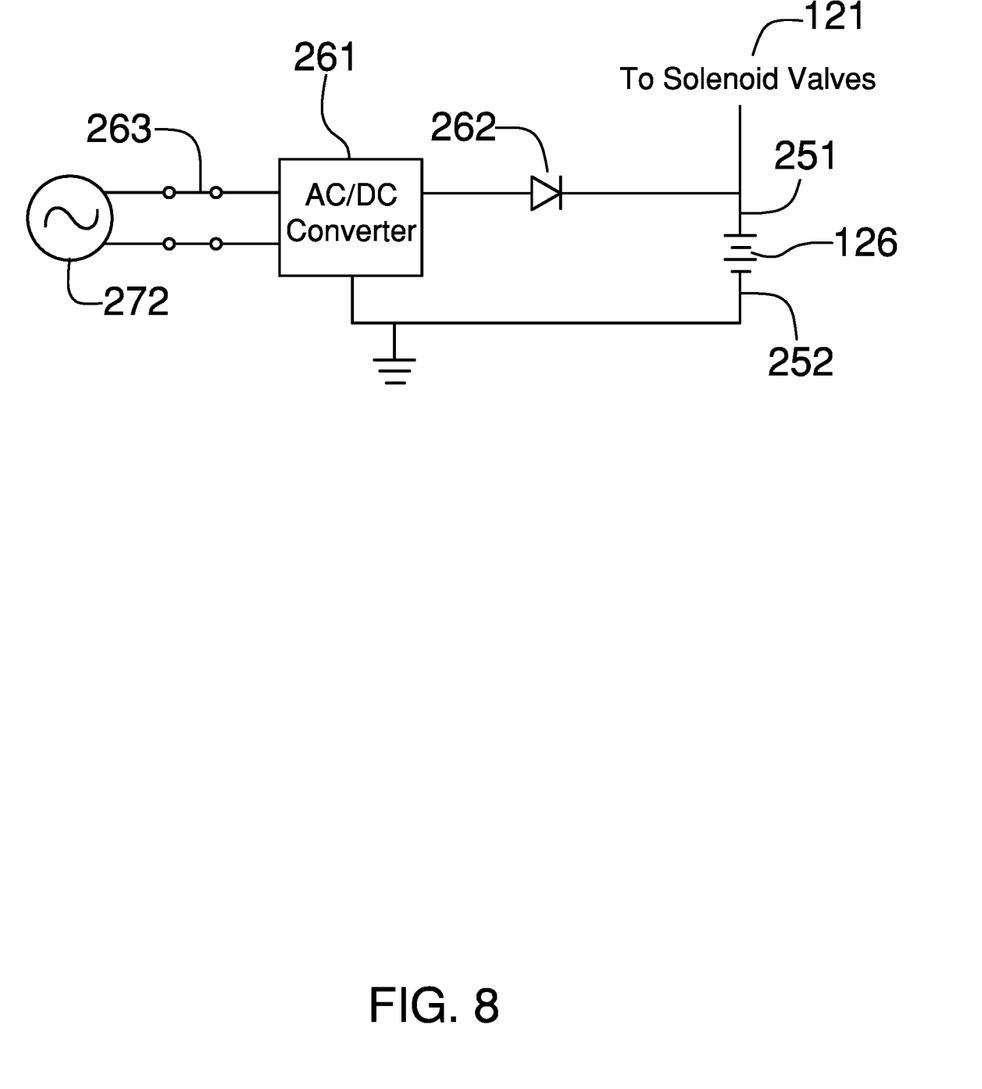
FIG. 8 is a schematic view of an embodiment of the disclosure.

Detailed reference will now be made to one or more potential embodiments of the disclosure, which are illustrated in FIGS. 1 through 8.

The rainwater collection device 100 (hereinafter invention): 1) pumps accumulated rainfall 273 from one or more storage containers 271 into a reservoir 101; and, 2) pumps irrigation water from the reservoir 101 to one or more plants identified by the user. The accumulated rainfall 273 refers to water collected from rainfall run off by the one or more storage containers 271. The invention 100 mounts on a wheeled cart 104 that readily transports the accumulated rainfall 273 throughout the space of a domestic garden. The invention 100 comprises the reservoir 101, a distribution system 102, a plurality of hoses 103, and the cart 104. The reservoir 101, the distribution system 102, and the plurality of hoses 103 mount on the cart 104.

The reservoir 101 is a container. The reservoir 101 receives and stores accumulated rainfall 273 that is pumped into the reservoir 101 from the one or more storage containers 271. The invention 100 distributes the accumulated rainfall 273 stored in the reservoir 101 for use as irrigation water. By portioning the accumulated rainfall 273 into smaller batches stored within the reservoir 101, the invention 100 allows a user to more readily transport the accumulated rainfall 273 to where it is needed. The reservoir 101 comprises a tank 111, an inlet 112, an outlet 113, and a bypass cap 114.

The tank 111 is a hollow container configured for use in storing a liquid. The inlet 112 is first access port formed in the tank 111. The accumulated rainfall 273 is introduced into the tank 111 through the inlet 112. The outlet 113 is second access port formed in the tank 111. The accumulated rainfall 273 is removed from the tank 111 through the outlet 113. The bypass cap 114 is third access port formed in the tank 111. The bypass cap 114 allows for the addition of an externally provided chemical into the accumulated rainfall 273 for horticultural purposes. An example of such an addition would include, but is not limited to, a herbicide or a pesticide.

The distribution system 102 is an electrically powered mechanical system. The distribution system 102: 1) pumps accumulated rainfall 273 from the one or more storage containers 271 into the reservoir 101; 2) pumps the accumulated rainfall 273 from the reservoir 101; and, 3) discharges the accumulated rainfall 273 from the invention 100 as irrigation water. The distribution system 102 comprises a plurality of valves 121, a plurality of check valves 122, a pump 123, a filter 124, a battery 125, and a plurality of switches 126. The battery 125 is further defined with a positive terminal 251 and a negative terminal 252.

Each of the plurality of valves 121 is a readily and commercially available device that is used to control the flow of the accumulated rainfall 273 through the distribution system 102. In the first potential embodiment of the disclosure, each of the plurality of valves 121 is a solenoid valve. The plurality of valves 121 comprises a supply feed valve 151, an irrigation valve 152, a reservoir feed valve 153, a reservoir discharge valve 154, a pump intake maintenance valve 155, and a pump discharge maintenance valve 156.

The supply feed valve 151 is a normally closed solenoid valve that controls the flow of the accumulated rainfall 273 from the one or more storage containers 271 into the distribution system 102. The irrigation valve 152 is a normally closed solenoid valve that controls the flow of the accumulated rainfall 273 from the distribution system 102 into the irrigation hose 132. The reservoir feed valve 153 is a normally closed solenoid valve that controls the flow of the accumulated rainfall 273 from the pump 123 into the reservoir 101. The reservoir discharge valve 154 is a normally closed solenoid valve that controls the flow of the accumulated rainfall 273 from the reservoir 101 into the pump 123.

The pump intake maintenance valve 155 is a normally closed solenoid valve that controls the flow of the accumulated rainfall 173 into the pump 123 for maintenance purposes. The pump discharge maintenance valve 156 is a normally closed solenoid valve that controls the accumulated rainfall 173 from the pump 123 for maintenance purposes. By simultaneously closing the pump intake maintenance valve 155 and the pump discharge maintenance valve 156, the pump 123 can be removed from the distribution system 102 while the accumulated rainfall remains contained within the invention 100.

The supply feed valve 151 is further defined with a first inlet port 201, a first outlet port 221, and a supply feed coil 241. The irrigation valve 152 is further defined with a second inlet port 202, a second outlet port 222, and an irrigation coil 242. The reservoir feed valve 153 is further defined with a third inlet port 203, a third outlet port 223, and a reservoir feed coil 243. The reservoir discharge valve 154 is further defined with a fourth inlet port 204, a fourth outlet port 224, and a reservoir discharge coil 244. The pump intake maintenance valve 155 is further defined with a fifth inlet port 205, a fifth outlet port 225, and a pump intake maintenance coil 245. The pump discharge maintenance valve 156 is further defined with a sixth inlet port 206, a sixth outlet port 226, and a pump discharge maintenance coil 246.

The supply feed coil 241 is an electrical coil that operates the supply feed valve 151. The irrigation coil 242 is an electrical coil that operates the supply feed valve 151. The reservoir feed coil 243 is an electrical coil that operates the supply feed valve 151. The reservoir discharge coil 244 is an electrical coil that operates the supply feed valve 151. The pump intake maintenance coil 245 is an electrical coil that operates the pump intake maintenance valve 155. The pump discharge maintenance coil 246 is an electrical coil that operates the pump discharge maintenance valve 156.

Each of the plurality of check valves 122 is a readily and commercially available device that is used to control the flow of the accumulated rainfall 273 through the distribution system 102. Each of the plurality of check valves 122 limits the flow of the accumulated rainfall 273 to one direction. Each of the plurality of check valves 122 is a ball valve. The plurality of check valves 122 comprises a supply feed check valve 161, an irrigation check valve 162, a reservoir feed check valve 163, and a reservoir discharge check valve 164.

The supply feed check valve 161 prevents the backflow of accumulated rainfall 273 into the first outlet port 221 of the supply feed valve 151. The irrigation check valve 162 prevents the backflow of accumulated rainfall 273 into the sixth outlet port 226 of the pump discharge maintenance valve 156 from the irrigation hose 132. The reservoir feed check valve 163 prevents the backflow of accumulated rainfall 273 into the sixth outlet port 226 of the pump discharge maintenance valve 156 from the reservoir 101. The reservoir discharge check valve 164 prevents the backflow of accumulated rainfall 273 into the outlet 113 of the reservoir 101 from the feed hose 131.

The supply feed check valve 161 is further defined with a seventh inlet port 207 and a seventh outlet port 227. The irrigation check valve 162 is further defined with an eighth inlet port 208 and an eighth outlet port 228. The reservoir feed check valve 163 is further defined with a ninth inlet port 209 and a ninth outlet port 229. The reservoir discharge check valve 164 is further defined with a tenth inlet port 210 and a tenth outlet port 230.

The pump 123 is an electrically powered mechanical device that generates the pressure differentials required to move the accumulated rainfall 273 through the distribution system 102. The pump 123 is further defined with an eleventh inlet port 211 and an eleventh outlet port 231.

The filter 124 is a mechanical device that removes solids from the accumulated rainfall 273 before the accumulated rainfall 273 is processed by the pump 123. The filter 124 comprises a filter housing 171 and a filter insert 172. The filter 124 is further defined with a twelfth inlet port 212 and a twelfth outlet port 232. The filter housing 171 is a permanently installed shell within which a filter insert 172 may be inserted. The filter insert 172 is a commercially available filter cartridge that is removably installed in the filter housing 171. The use of the filter insert 172 allows for ready maintenance of the filter 124.

The battery 125 is a readily and commercially available rechargeable battery 125 that further comprises an ac/dc converter 261, a diode 262, and a plug 263.

The chemical energy stored in the battery 125 is renewed and restored through the use of the ac/dc converter 261. The ac/dc converter 261 is an electrical device that reverses the polarity of the battery 125 and provides the energy necessary to reverse the chemical processes that the battery 125 initially used to generate the electrical energy. This reversal of the chemical process creates a chemical potential energy that will later be used by the battery 125 to generate electricity.

The ac/dc converter 261 attaches to an external power source from which it draws electrical energy. In the first potential embodiment of the disclosure, the external power source comprises the national electric grid 272. The diode 262 is an electrical device that allows current to flow in only one direction. The diode 262 connects between the battery 125 and the ac/dc converter 261 such that electricity will not flow from the positive terminal 251 of the battery 125 into the ac/dc converter 261.

The ac/dc converter 261 is an electrical device that converts an ac voltage into a regulated dc voltage. The ac/dc converter 261 attaches to the national electric grid 272 using the plug 263. The plug 263 is a well-known and documented NEMA 5-15P electrical plug. The NEMA 5-15P electrical plug is discussed in greater detail elsewhere in this disclosure. The national electric grid 272 is discussed in greater detail elsewhere in this disclosure.

Each of the plurality of switches 126 is a readily and commercially available maintained switch. The plurality of switches 126 are used to control the operation of the plurality of valves 121 and the operation of the pump 123. The plurality of switches 126 comprises a supply switch 191, a release switch 192, a pump maintenance switch 193, and a pump power switch 194.

The supply switch 191 is a single pole single throw maintained switch that simultaneously actuates the supply feed valve 151 and the reservoir feed valve 153. The release switch is a single pole single throw maintained switch that simultaneously actuates the irrigation valve 152 and the reservoir discharge valve 154. The pump maintenance switch 193 is a single pole single throw maintained switch that simultaneously actuates the pump intake maintenance valve 155 and the pump discharge maintenance valve 156. The pump power switch 194 is a single pole single throw maintained switch that operates the pump 123.

Each of the plurality of hoses 103 is a hose that is commonly referred to as a garden hose. The plurality of hoses 103: 1) attaches the invention 100 to the one or more storage containers 271 for the purpose of withdrawing the accumulated rainfall 273 from the one or more storage containers 271; and, 2) provides the user with the means to control the distribution of irrigation water as it is discharged from the invention 100. The plurality of hoses 103 comprises a feed hose 131 and an irrigation hose 132. The feed hose 131 is a flexible tube that transports accumulated rainfall 273 from the one or more storage containers 271 to the distribution system 102. The irrigation hose 132 is a flexible tube that discharges the accumulated rainfall 273 from the distribution system 102.

The cart 104 is a vehicle that is used to transport the invention 100. The reservoir 101, the distribution system 102, and the plurality of hoses 103 are contained within the cart 104. The cart 104 comprises a box 141, a tongue 142, and a plurality of wheels 143. The box 141 is a supporting surface that is formed by the cart 104. The reservoir 101 and the distribution system 102 rest upon the box 141. The tongue 142 is a handle that is used to pull the cart 104 to its desired location. Each of the plurality of wheels 143 is selected from the group consisting of a wheel and a caster. Each of the plurality of wheels 143 is attached to the box 141. The plurality of wheels 143 allows the cart 104 to be rolled during use of the invention 100.

The box 141 further comprises a plurality of hose wraps 180. Each of the plurality of hose wraps 180 comprises a plurality of posts around which a hose selected from the plurality of hoses 103 may be wrapped for storage. Each of the plurality of hose wraps 180 is attached to the box 141 of the cart 104. The plurality of hose wraps 180 comprises a first hose wrap 181 and a second hose wrap 182. The feed hose 131 wraps around the first hose wrap 181. The irrigation hose 132 wraps around the second hose wrap 182.

The assembly of the distribution system 102 is described in the following eight paragraphs.

The feed hose 131 connects fluidically with the first inlet port 201 of the supply feed valve 151. The first outlet port 221 of the supply feed valve 151 connects fluidically with the seventh inlet port 207 of the supply feed check valve 161. The seventh outlet port 227 of the supply feed check valve 161 connects fluidically with the tenth outlet port 230 of the reservoir discharge check valve 164. The seventh outlet port 227 of the supply feed check valve 161 connects fluidically with the twelfth inlet port 212 of the filter 124.

The twelfth outlet port 232 of the filter 124 connects fluidically with the fifth inlet port 205 of the pump intake maintenance valve 155. The fifth outlet port 225 of the pump intake maintenance valve 155 connects fluidically with the eleventh inlet port 211 of the pump 123. The eleventh outlet port 231 of the pump 123 connects fluidically with the sixth inlet port 206 of the pump discharge maintenance valve 156.

The sixth outlet port 226 of the pump discharge maintenance valve 156 connects fluidically with the eighth inlet port 208 of the irrigation check valve 162. The sixth outlet port 226 of the pump discharge maintenance valve 156 connects fluidically with the ninth inlet port 209 of the reservoir feed check valve 163. The eighth inlet port 208 of the irrigation check valve 162 connects fluidically with the ninth inlet port 209 of the reservoir feed check valve 163. The eighth outlet port 228 of the irrigation check valve 162 connects fluidically with the second inlet port 202 of the irrigation valve 152. The irrigation hose 132 connects fluidically with the second outlet port 222 of the irrigation valve 152.

The ninth outlet port 229 of the reservoir feed check valve 163 connects fluidically with the third inlet port 203 of the reservoir feed valve 153. The third outlet port 223 of the reservoir feed valve 153 connects fluidically with the inlet 112 of the reservoir 101. The outlet 113 of the reservoir 101 connects fluidically with the fourth inlet port 204 of the reservoir discharge valve 154. The fourth outlet port 224 of the reservoir discharge valve 154 connects fluidically with the tenth inlet port 210 of the reservoir discharge check valve 164.

The supply switch 191 electrically connects in series between the battery 125 and both the supply feed coil 241 and the reservoir feed coil 243 such that the states of the supply feed valve 151 and the reservoir feed valve 153 are selected from the group consisting of: 1) both the supply feed valve 151 and the reservoir feed valve 153 are simultaneously open; or, 2) both the supply feed valve 151 and the reservoir feed valve 153 are simultaneously closed.

The release switch 192 electrically connects in series between the battery 125 and both the reservoir discharge coil 244 and the irrigation coil 242 such that the states of the reservoir discharge valve 154 and the irrigation valve 152 are selected from the group consisting of: 1) both the reservoir discharge valve 154 and the irrigation valve 152 are simultaneously open; or, 2) both the reservoir discharge valve 154 and the irrigation valve 152 are simultaneously closed.

The pump maintenance switch 193 electrically connects in series between the battery 125 and both the pump intake maintenance coil 245 and the pump discharge maintenance coil 246 such that the states of the pump intake maintenance valve 155 and the pump discharge maintenance valve 156 are selected from the group consisting of: 1) both the pump intake maintenance valve 155 and the pump discharge maintenance valve 156 are simultaneously open; or, 2) both the pump intake maintenance valve 155 and the pump discharge maintenance valve 156 are simultaneously closed.

The pump power switch 194 electrically connects in series between the battery 125 and the pump 123 such that the battery 125 initiates and discontinues the operation of the pump 123.

The use of the invention 100 is described in the following three paragraphs. To discharge irrigation water from the reservoir 101 through the irrigation hose 132: 1) the supply switch 191 is opened such that the supply feed valve 151 and the reservoir feed valve 153 are simultaneously closed; 2) the release switch 192 is closed such that the irrigation valve 152 and the reservoir discharge valve 154 are simultaneously open; 3) the pump maintenance switch 193 is closed such that the pump intake maintenance valve 155 and the pump discharge maintenance valve 156 are simultaneously open; and, 4) the pump power switch 194 is closed such that electrical power can flow to the pump 123.

To transport accumulated rainfall 273 from the one or more storage containers 271 to the reservoir 101: 1) the supply switch 191 is closed such that the supply feed valve 151 and the reservoir feed valve 153 are simultaneously open 2) the release switch 192 is opened such that the irrigation valve 152 and the reservoir discharge valve 154 are simultaneously closed; 3) the pump maintenance switch 193 is closed such that the pump intake maintenance valve 155 and the pump discharge maintenance valve 156 are simultaneously open; and, 4) the pump power switch 194 is closed such that electrical power can flow to the pump 123.

To remove the pump 123 for maintenance: 1) the supply switch 191, the release switch 192, and the pump maintenance switch 193 are simultaneously opened which simultaneously closes the supply feed valve 151, the irrigation valve 152, the reservoir feed valve 153, the reservoir discharge valve 154, the pump intake maintenance valve 155, and the pump discharge maintenance valve 156; and 2) the pump power switch 194 is opened to disconnect the pump 123 from the battery 125 and the ac/dc converter 261.

The following definitions were used in this disclosure:

AC: As used in this disclosure, AC is an acronym for alternating current.

AC/DC Converter: As used in this disclosure, an AC/DC converter is an electrical device that converts an AC voltage into a regulated DC voltage. Method to design and build AC/DC converters are well known in the electrical arts.

Ball Valve: As used in this disclosure, a ball valve is a type of commercially available check valve.

Barrel: As used in this disclosure, a barrel is a cylindrical, or roughly cylindrical, structure that is intended to contain a fluid.

Battery: As used in this disclosure, a battery is a chemical device consisting of one or more cells, in which chemical energy is converted into electricity and used as a source of power.

Cart: A small vehicle that can be easily moved by a person. A cart typically comprises a box, a tongue, and a plurality of wheels. The box contains cargo to be moved by the cart. The tongue is the structure through which a motive force is applied. The tongue is often rotatable such that the angle of application of a motive force can be adjusted to turn the cart. Each of the plurality of wheels is a rotating structure that minimizes frictional forces applied to the cart during motion.

Caster: As used in this disclosure, a caster is a wheel mounted on a swivel that allows the wheel to adjust, or swivel, the direction of rotation of the wheel to the direction of motion desired for the wheel.

Check Valve: As used in this disclosure, a check valve is a valve that permits the flow of fluid or gas in a single direction. Within selected potential embodiments of this disclosure, the check valve is a commercially available product selected from the group consisting of a ball valve and a Tesla valve.

DC: As used in this disclosure, DC is an acronym for direct current.

Diode: As used in this disclosure, a diode is a two terminal semiconductor device that allows current flow in only one direction. The two terminals are called the anode and the cathode. Electric current is allowed to pass from the anode to the cathode.

External Power Source: As used in this disclosure, an external power source is a source of the energy that is externally provided to enable the operation of the present disclosure. Examples of external power sources include, but are not limited to, electrical power sources and compressed air sources.

Faucet: As used in this disclosure, a faucet refers to a valve and a discharge pipe that draws water from a pipe or reservoir and discharges the drawn water through the discharge pipe.

Filter: As used in this disclosure, a filter is a mechanical device that is used to separate solids suspended in a liquid or gas.

GHT: As used in this disclosure, GHT refers to a standard Garden Hose Thread. The GHT is a threaded connection standard used in the United States for attaching a garden hose to a water supply of for attaching a one of a plurality of attachments to the garden hose.

Hose: As used in this disclosure, a hose is a flexible hollow cylindrical device used for transporting liquids and gases. When referring to a hose in this disclosure, the terms inner diameter and outer diameter are used as they would be used by those skilled in the plumbing arts. In this disclosure, the term hose refers to a garden hose intended for use for residential landscaping and other domestic uses.

Maintained Switch: A used in this disclosure, a maintained switch is a switch that maintains the position that was set in the most recent switch actuation. A maintained switch works in an opposite manner to a momentary switch.

National Electric Grid: As used in this disclosure, the national electric grid is a synchronized and highly interconnected electrical network that distributes energy in the form of electric power from a plurality of generating stations to consumers of electricity.

NEMA 5-15P Electrical Plug: As used in this disclosure, the NEMA 5-15P Electrical Plug is a plug that is designed to be inserted into a NEMA 5-15 Electrical Socket to deliver electrical power to electrical devices. The NEMA 5-15P Electrical Plug is a 3 blade plug commonly found in residential and office environments within the United States.

Pipe: As used in this disclosure, a pipe is a hollow cylindrical device used for transporting liquids and gases. The line that connects the center of the first base of the cylinder to the center of the second base of the cylinder is referred to as the axis of the cylinder or the centerline of the pipe. When two pipes share the same centerline they are said to be aligned. In this disclosure, the terms inner diameter of a pipe and outer diameter are used as they would be used by those skilled in the plumbing arts.

Port: As used in this disclosure, a port is an opening formed in an object that allows fluid to flow through the boundary of the object.

Pump: As used in this disclosure, a pump is a mechanical device that uses suction or pressure to raise or move fluids, compress fluids, or force a fluid into an inflatable object. Within this disclosure, a compressor refers to a pump dedicated to compressing a fluid or placing a fluid under pressure.

Reservoir: As used in this disclosure, a reservoir refers to a container or containment system that is configured to store a liquid.

Roll: As used in this disclosure, the term roll refers to the motion of an object that is facilitated by the rotation of one or more wheels or casters.

Solenoid: As used in this disclosure, a solenoid is a cylindrical coil of electrical wire that generates a magnetic field that can be used to mechanically move a shaft made of a magnetic core.

Solenoid Valve: As used in this disclosure, a solenoid valve is an electromechanically controlled valve that is used to control fluid or gas flow. A two port solenoid valve opens or closes to fluid flow through the valve portion of the solenoid valve. A three port solenoid valve switched fluid or gas flow between a first port and a second port to either feed or be fed from a third port.

Unregulated Voltage: This refers to a source of DC voltage that changes in response to changes in the circuit's input power supply voltage or changes in output, or load, current.

Voltage Regulator: This refers to an electrical circuit that takes unregulated voltage as its power input and provides a constant output voltage independent of variations in input power supply voltage or output, or load, current.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

Valve: As used in this disclosure, a valve is a device used to control the flow of a fluid (gas or liquid) through a pipe.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A rainwater distribution system comprising
a reservoir, a distribution system, a plurality of hoses, and a cart;
wherein the reservoir, the distribution system, and the plurality of hoses mount on the cart;
wherein the rainwater distribution system collects accumulated rainfall from one or more storage containers into the reservoir;
wherein the rainwater distribution system pumps the accumulated rainfall from the reservoir for use in irrigation;
wherein the accumulated rainfall refers to water collected from rainfall run off by the one or more storage containers;
wherein the distribution system comprises a plurality of valves, a plurality of check valves, a pump, a filter, a battery, and a plurality of switches;
wherein the plurality of switches comprises a supply switch, a release switch, a pump maintenance switch, and a pump power switch;
wherein the plurality of valves comprises a supply feed valve, an irrigation valve, a reservoir feed valve, a reservoir discharge valve, a pump intake maintenance valve, and a pump discharge maintenance valve;
wherein the supply switch simultaneously actuates the supply feed valve and the reservoir feed valve;
wherein the release switch simultaneously actuates the irrigation valve and the reservoir discharge valve;
wherein the pump maintenance switch simultaneously actuates the pump intake maintenance valve and the pump discharge maintenance valve;
wherein the pump power switch operates the pump.

2. The rainwater distribution system according to claim 1
wherein the reservoir is a hollow container;
wherein the distribution system is an electrically powered mechanical system;
wherein the distribution system pumps accumulated rainfall from the one or more storage containers into the reservoir;
wherein the distribution system pumps the accumulated rainfall from the reservoir;
wherein the distribution system discharges the accumulated rainfall from the rainwater distribution system for irrigation.

3. The rainwater distribution system according to claim 2
wherein the reservoir comprises a tank, an inlet, an outlet, and a bypass cap;
wherein the tank is the hollow container;
wherein the inlet is first access port formed in the tank;
wherein the outlet is second access port formed in the tank;
wherein the bypass cap is third access port formed in the tank.

4. The rainwater distribution system according to claim 3
wherein the plurality of valves, the plurality of check valves, the pump, and the filter are interconnected fluidically;

wherein the battery and the plurality of switches control the plurality of valves and the pump;

wherein the battery is further defined with a positive terminal and a negative terminal.

5. The rainwater distribution system according to claim 4 wherein each of the plurality of valves controls the flow of the accumulated rainfall through the distribution system; wherein the plurality of hoses comprises a feed hose and an irrigation hose; wherein the supply feed valve is a normally closed solenoid valve wherein the supply feed valve controls the flow of the accumulated rainfall from the one or more storage containers into the distribution system; wherein the irrigation valve is a normally closed solenoid valve; wherein the irrigation valve controls the flow of the accumulated rainfall from the distribution system into the irrigation hose; wherein the reservoir feed valve is a normally closed solenoid valve; wherein the reservoir feed valve controls the flow of the accumulated rainfall from the pump into the reservoir; wherein the reservoir discharge valve is a normally closed solenoid valve; wherein the reservoir discharge valve controls the flow of the accumulated rainfall from the reservoir into the pump; wherein the pump intake maintenance valve is a normally closed solenoid valve; wherein the pump intake maintenance valve controls the flow of the accumulated rainfall into the pump; wherein the pump discharge maintenance valve is a normally closed solenoid valve; wherein the pump discharge maintenance valve controls the flow of the accumulated rainfall from the pump; wherein the supply feed valve is further defined with a first inlet port, a first outlet port, and a supply feed coil; wherein the irrigation valve is further defined with a second inlet port, a second outlet port, and an irrigation coil; wherein the reservoir feed valve is further defined with a third inlet port, a third outlet port, and a reservoir feed coil; wherein the reservoir discharge valve is further defined with a fourth inlet port, a fourth outlet port, and a reservoir discharge coil; wherein the pump intake maintenance valve is further defined with a fifth inlet port, a fifth outlet port, and a pump intake maintenance coil; wherein the pump discharge maintenance valve is further defined with a sixth inlet port, a sixth outlet port, and a pump discharge maintenance coil.

6. The rainwater distribution system according to claim 5
wherein the plurality of check valves comprises a supply feed check valve, an irrigation check valve, a reservoir feed check valve, and a reservoir discharge check valve;
wherein the supply feed check valve is a ball valve;
wherein the supply feed check valve prevents the backflow of accumulated rainfall into the first outlet port of the supply feed valve;
wherein the irrigation check valve is a ball valve;
wherein the irrigation check valve prevents the backflow of accumulated rainfall into the sixth outlet port of the pump discharge maintenance valve from the irrigation hose;
wherein the reservoir feed check valve is a ball valve;
wherein the reservoir feed check valve prevents the backflow of accumulated rainfall into the sixth outlet port of the pump discharge maintenance valve from the reservoir;
wherein the reservoir discharge check valve is a ball valve;
wherein the reservoir discharge check valve prevents the backflow of accumulated rainfall into the outlet of the reservoir from the feed hose;
wherein the supply feed check valve is further defined with a seventh inlet port and a seventh outlet port;
wherein the irrigation check valve is further defined with an eighth inlet port and an eighth outlet port;
wherein the reservoir feed check valve is further defined with a ninth inlet port and a ninth outlet port;
wherein the reservoir discharge check valve is further defined with a tenth inlet port and a tenth outlet port.

7. The rainwater distribution system according to claim 6
wherein the pump is an electrically powered mechanical device;
wherein the pump generates the pressure differentials required to move the accumulated rainfall through the distribution system;
wherein the pump is further defined with an eleventh inlet port and an eleventh outlet port.

8. The rainwater distribution system according to claim 7
wherein the filter is a mechanical device;
wherein the filter removes solids from the accumulated rainfall before the pump processes the accumulated rainfall.

9. The rainwater distribution system according to claim 8
wherein the battery is a rechargeable battery;
wherein the battery further comprises an ac/dc converter, a diode, and a plug;
wherein the battery the ac/dc converter, the diode, and the plug are electrically interconnected.

10. The rainwater distribution system according to claim 9
wherein the plurality of switches control the operation of the plurality of valves and the operation of the pump;
wherein each of the supply switch, the release switch, the pump maintenance switch, and the pump power switch electrically connect to the battery.

11. The rainwater distribution system according to claim 10 wherein the feed hose is a flexible tube that transports accumulated rainfall from the one or more storage containers to the distribution system; wherein the irrigation hose is a flexible tube that discharges the accumulated rainfall from the distribution system.

12. The rainwater distribution system according to claim 11
wherein the cart is a vehicle
wherein the cart transports the rainwater distribution system;
wherein the cart comprises a box, a tongue, and a plurality of wheels;
wherein the reservoir and the distribution system rest upon the box;
wherein the tongue is a handle that is used to pull the cart to its desired location;
wherein each of the plurality of wheels is attached to the box;
wherein the box further comprises a plurality of hose wraps.

13. The rainwater distribution system according to claim 12
wherein the pump intake maintenance valve isolates the pump;
wherein the pump discharge maintenance valve isolates the pump.

14. The rainwater distribution system according to claim 13
wherein the supply feed coil is an electrical coil;
wherein the irrigation coil is an electrical coil;
wherein the reservoir feed coil is an electrical coil;
wherein the reservoir discharge coil is an electrical coil;
wherein the pump intake maintenance coil is an electrical coil;

wherein the pump discharge maintenance coil is an electrical coil;
wherein the supply feed coil operates the supply feed valve;
wherein the irrigation coil operates the supply feed valve;
wherein the reservoir feed coil operates the supply feed valve;
wherein the reservoir discharge coil operates the supply feed valve;
wherein the pump intake maintenance coil operates the pump intake maintenance valve;
wherein the pump discharge maintenance coil operates the pump discharge maintenance valve.

15. The rainwater distribution system according to claim 14
wherein the filter comprises a filter housing and a filter insert;
wherein the filter is further defined with a twelfth inlet port and a twelfth outlet port;
wherein the filter housing is a permanently installed shell;
wherein the filter insert is removably installed in the filter housing.

16. The rainwater distribution system according to claim 15
wherein the ac/dc converter reverses the polarity of the battery;
wherein the plug attaches the ac/dc converter to an external power source;
wherein the diode is an electrical device that allows current to flow in only one direction;
wherein the diode connects between the battery and the ac/dc converter such that electricity will not flow from the positive terminal of the battery into the ac/dc converter.

17. The rainwater distribution system according to claim 16
wherein the supply switch is a single pole single throw maintained switch;
wherein the release switch is a single pole single throw maintained switch;
wherein the pump maintenance switch is a single pole single throw maintained switch;
wherein the pump power switch is a single pole single throw maintained switch.

18. The rainwater distribution system according to claim 17
wherein the feed hose connects fluidically with the first inlet port of the supply feed valve;
wherein the first outlet port of the supply feed valve connects fluidically with the seventh inlet port of the supply feed check valve;
wherein the seventh outlet port of the supply feed check valve connects fluidically with the tenth outlet port of the reservoir discharge check valve;
wherein the seventh outlet port of the supply feed check valve connects fluidically with the twelfth inlet port of the filter;
wherein the twelfth outlet port of the filter connects fluidically with the fifth inlet port of the pump intake maintenance valve;
wherein the fifth outlet port of the pump intake maintenance valve connects fluidically with the eleventh inlet port of the pump;
wherein the eleventh outlet port of the pump connects fluidically with the sixth inlet port of the pump discharge maintenance valve;
wherein the sixth outlet port of the pump discharge maintenance valve connects fluidically with the eighth inlet port of the irrigation check valve;
wherein the sixth outlet port of the pump discharge maintenance valve connects fluidically with the ninth inlet port of the reservoir feed check valve;
wherein the eighth inlet port of the irrigation check valve connects fluidically with the ninth inlet port of the reservoir feed check valve;
wherein the eighth outlet port of the irrigation check valve connects fluidically with the second inlet port of the irrigation valve;
wherein the irrigation hose connects fluidically with the second outlet port of the irrigation valve;
wherein the ninth outlet port of the reservoir feed check valve connects fluidically with the third inlet port of the reservoir feed valve;
wherein the third outlet port of the reservoir feed valve connects fluidically with the inlet of the reservoir;
wherein the outlet of the reservoir connects fluidically with the fourth inlet port of the reservoir discharge valve;
wherein the fourth outlet port of the reservoir discharge valve connects fluidically with the tenth inlet port of the reservoir discharge check valve.

19. The rainwater distribution system according to claim 18
wherein the supply switch electrically connects in series between the battery and both the supply feed coil and the reservoir feed coil such that the states of the supply feed valve and the reservoir feed valve are selected from the group consisting of both the supply feed valve and the reservoir feed valve are simultaneously open or, both the supply feed valve and the reservoir feed valve are simultaneously closed;
wherein the release switch electrically connects in series between the battery and both the reservoir discharge coil and the irrigation coil such that the states of the reservoir discharge valve and the irrigation valve are selected from the group consisting of both the reservoir discharge valve and the irrigation valve are simultaneously open or, both the reservoir discharge valve and the irrigation valve are simultaneously closed;
wherein the pump maintenance switch electrically connects in series between the battery and both the pump intake maintenance coil and the pump discharge maintenance coil such that the states of the pump intake maintenance valve and the pump discharge maintenance valve are selected from the group consisting of both the pump intake maintenance valve and the pump discharge maintenance valve are simultaneously open or, both the pump intake maintenance valve and the pump discharge maintenance valve are simultaneously closed;
wherein the pump power switch electrically connects in series between the battery and the pump such that the battery initiates and discontinues the operation of the pump.

* * * * *